United States Patent [19]

Juravich

[11] Patent Number: 5,294,838
[45] Date of Patent: Mar. 15, 1994

[54] THERMOSTATICALLY CONTROLLED ELECTRICAL OUTLET APPARATUS

[76] Inventor: Gerard D. Juravich, 401 Lewis St., Canastota, N.Y. 13032

[21] Appl. No.: 819,985

[22] Filed: Jan. 13, 1992

[51] Int. Cl.$^5$ .......................... H01H 37/00; H02J 3/00
[52] U.S. Cl. ..................................... 307/117; 307/39; 361/640
[58] Field of Search ............ 307/117, 147, 39; 361/347, 428, 355, 161–165, 211, 640, 637, 826, 628; 439/110–122, 209, 211, 214, 216, 372; 174/49, 66, 68.2, 100, 99 B; 362/226, 285

[56] References Cited

U.S. PATENT DOCUMENTS

| | | | |
|---|---|---|---|
| 751,321 | 2/1904 | Miller | 439/120 |
| 2,541,294 | 2/1951 | Ronci | 439/372 |
| 2,957,740 | 10/1960 | Lewis | 174/66 X |
| 3,486,081 | 12/1969 | Kanbar | 307/117 X |
| 4,060,123 | 11/1977 | Hoffman et al. | 361/165 X |
| 4,315,161 | 2/1982 | Bailey | 307/117 X |
| 4,484,185 | 11/1984 | Graves | 174/66 X |
| 4,773,869 | 9/1989 | Smart et al. | 439/120 |
| 4,902,906 | 2/1990 | Murphy | 307/117 |
| 4,975,819 | 12/1990 | Reimers | 362/285 |

FOREIGN PATENT DOCUMENTS 340747 9/1921 Fed. Rep. of Germany ...... 362/285

*Primary Examiner*—A. D. Pellinen
*Assistant Examiner*—F. M. Fleming
*Attorney, Agent, or Firm*—Leon Gilden

[57] ABSTRACT

An outlet housing includes a plurality of electrical outlets directed through a front wall thereof in electrical communication with a plug member mounted to a rear wall of the housing. A first selector switch is arranged to control electrical communication of the electrical plug with the outlets when below a predetermined temperature, or selectively above that predetermined temperature. A second selector switch is arranged to effect selective bypassing of a control circuit to effect direct electrical communication of the electrical plug with the electrical outlets bypassing a thermostatically controlled control circuit.

3 Claims, 4 Drawing Sheets

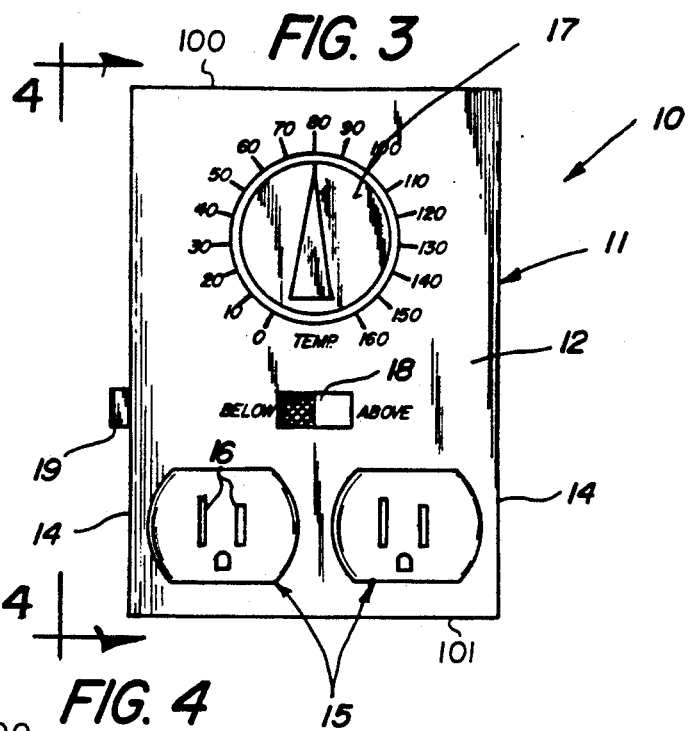
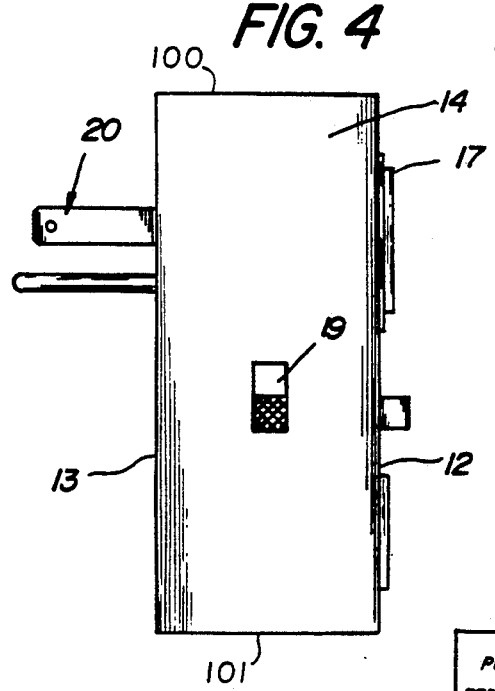
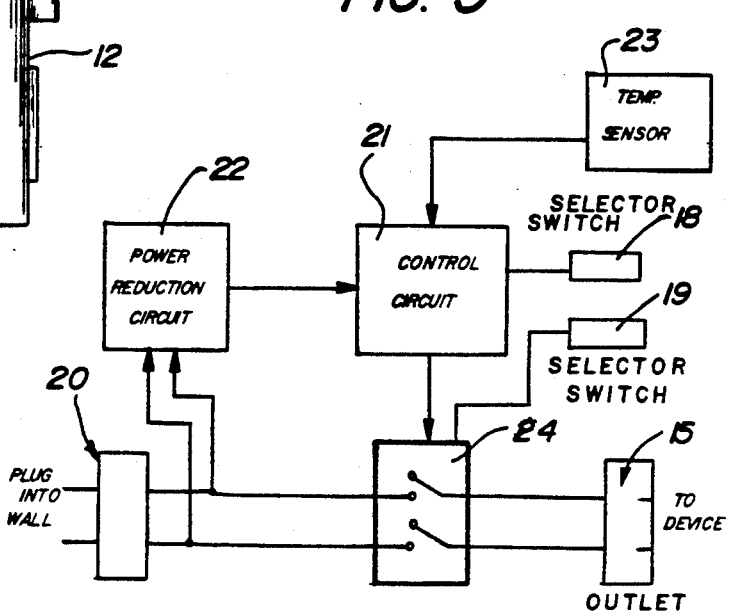

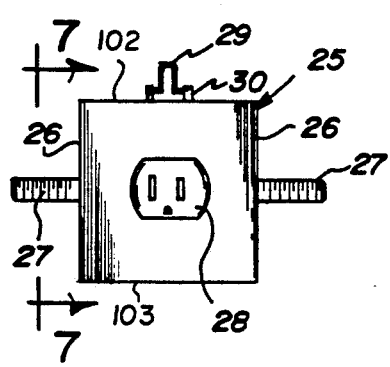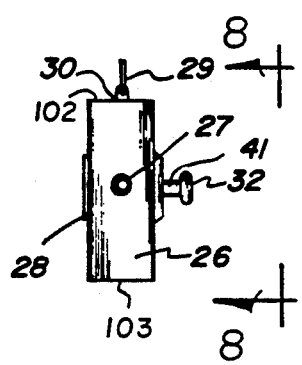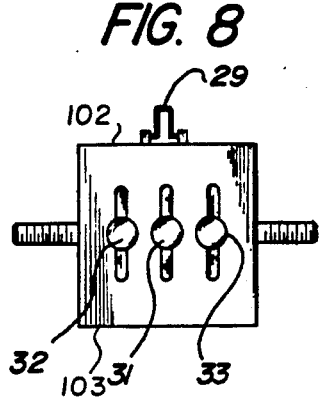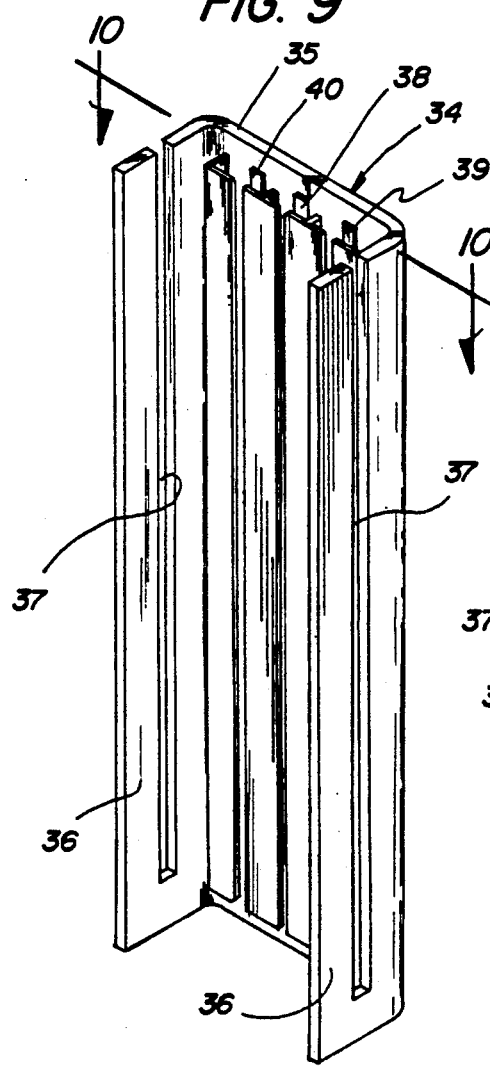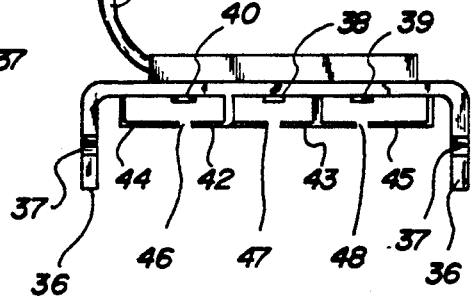

THERMOSTATICALLY CONTROLLED ELECTRICAL OUTLET APPARATUS

BACKGROUND OF THE INVENTION

1. Field of the Invention

The field of invention relates to electrical outlet apparatus, and more particularly pertains to a new and improved thermostatically controlled electrical outlet apparatus wherein the same effects electrical communication dependent upon ambient air temperature.

2. Description of the Prior Art

Various thermostat control devices are utilized in the prior art for effecting electrical communication based upon temperature sensitivity. Such apparatus is exemplified in the U.S. Pat. No. 4,824,013 to Gouldey; U.S. Pat. No. 3,999,099 to Herion; U.S. Pat. No. 4,864,270 to Gouldey; and U.S. Pat. No. 4,948,044 to Cacciatore.

It may be appreciated, however, that there continues to be a need for a new and improved thermostatically controlled electrical outlet apparatus as set forth by the instant invention which addresses both the problems of ease of use as well as effectiveness in construction in providing for selective electrical communication of an electrical source with electrical outlets selectively above or below a predetermined temperature and in this respect, the present invention substantially fulfills this need.

SUMMARY OF THE INVENTION

In view of the foregoing disadvantages inherent in the known types of electrical outlet apparatus now present in the prior art, the present invention provides a thermostatically controlled electrical outlet apparatus wherein the same is arranged for effecting selective electrical communication to an outlet structure selectively above or below a predetermined temperature. As such, the general purpose of the present invention, which will be described subsequently in greater detail, is to provide a new and improved thermostatically controlled electrical outlet apparatus which has all the advantages of the prior art electrical outlet apparatus and none of the disadvantages.

To attain this, the present invention provides an outlet housing including a plurality of electrical outlets directed through a front wall thereof in electrical communication with a plug member mounted to a rear wall of the housing. A first selector switch is arranged to control electrical communication of the electrical plug with the outlets when below a predetermined temperature, or selectively above that predetermined temperature. A second selector switch is arranged to effect selective bypassing of a control circuit to effect direct electrical communication of the electrical plug with the electrical outlets bypassing a thermostatically controlled control circuit.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved thermostatically controlled electrical outlet apparatus which has all the advantages of the prior art electrical outlet apparatus and none of the disadvantages.

It is another object of the present invention to provide a new and improved thermostatically controlled electrical outlet apparatus which may be easily and efficiently manufactured and marketed.

It is a further object of the present invention to provide a new and improved thermostatically controlled electrical outlet apparatus which is of a durable and reliable construction.

An even further object of the present invention is to provide a new and improved thermostatically controlled electrical outlet apparatus which is susceptible of a low cost of manufacture with regard to both materials and labor, and which accordingly is then susceptible of low prices of sale to the consuming public, thereby making such thermostatically controlled electrical outlet apparatus economically available to the buying public.

Still yet another object of the present invention is to provide a new and improved thermostatically controlled electrical outlet apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic frontal view of the instant invention.

FIG. 4 is an orthographic side view of the invention.

FIG. 5 is a diagrammatic illustration of the control circuitry of the invention.

FIG. 6 is an orthographic front view of a slide adapter utilized by the invention.

FIG. 7 is an orthographic side view of the slide adapter.

FIG. 8 is an orthographic rear view of the slide adapter.

FIG. 9 is an isometric illustration of an adapter receiving housing.

FIG. 10 is an orthographic view, taken along the lines 10—10 of FIG. 9 in the direction indicated by the arrows.

DESCRIPTION OF THE PREFERRED EMBODIMENT

Figure 1:
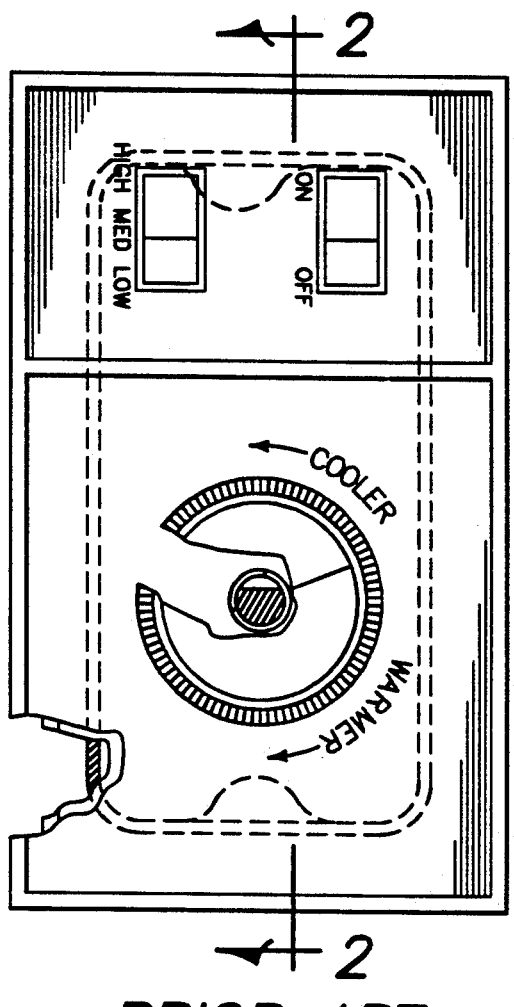
FIG. 1 is an orthographic side view of a prior art thermostatic control structure.

With reference now to the drawings, and in particular to FIGS. 1 to 11 thereof, a new and improved thermostatically controlled electrical outlet apparatus embodying the principles and concepts of the present invention and generally designated by the reference numerals 10 and 10a will be described.

Figure 2:
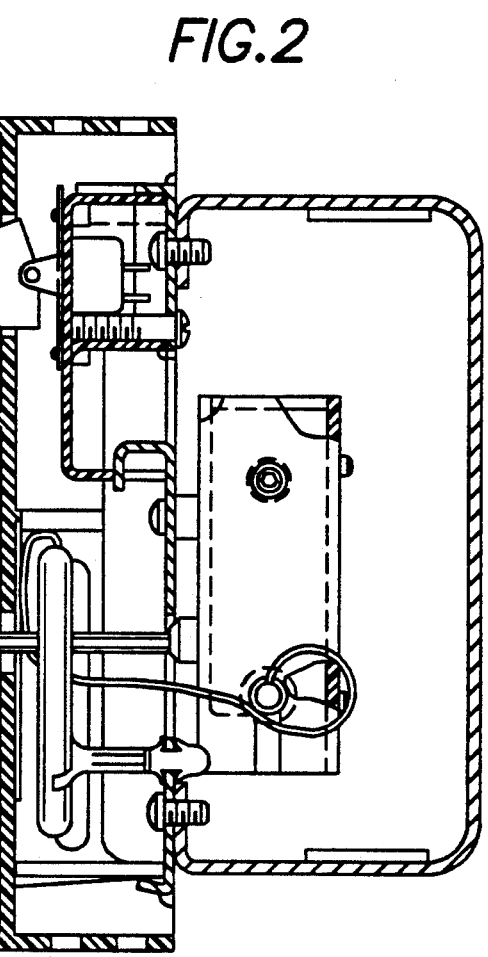
FIG. 2 is an orthographic side view of the thermostatically controlled structure as set forth in FIG. 1.
Figure 11:
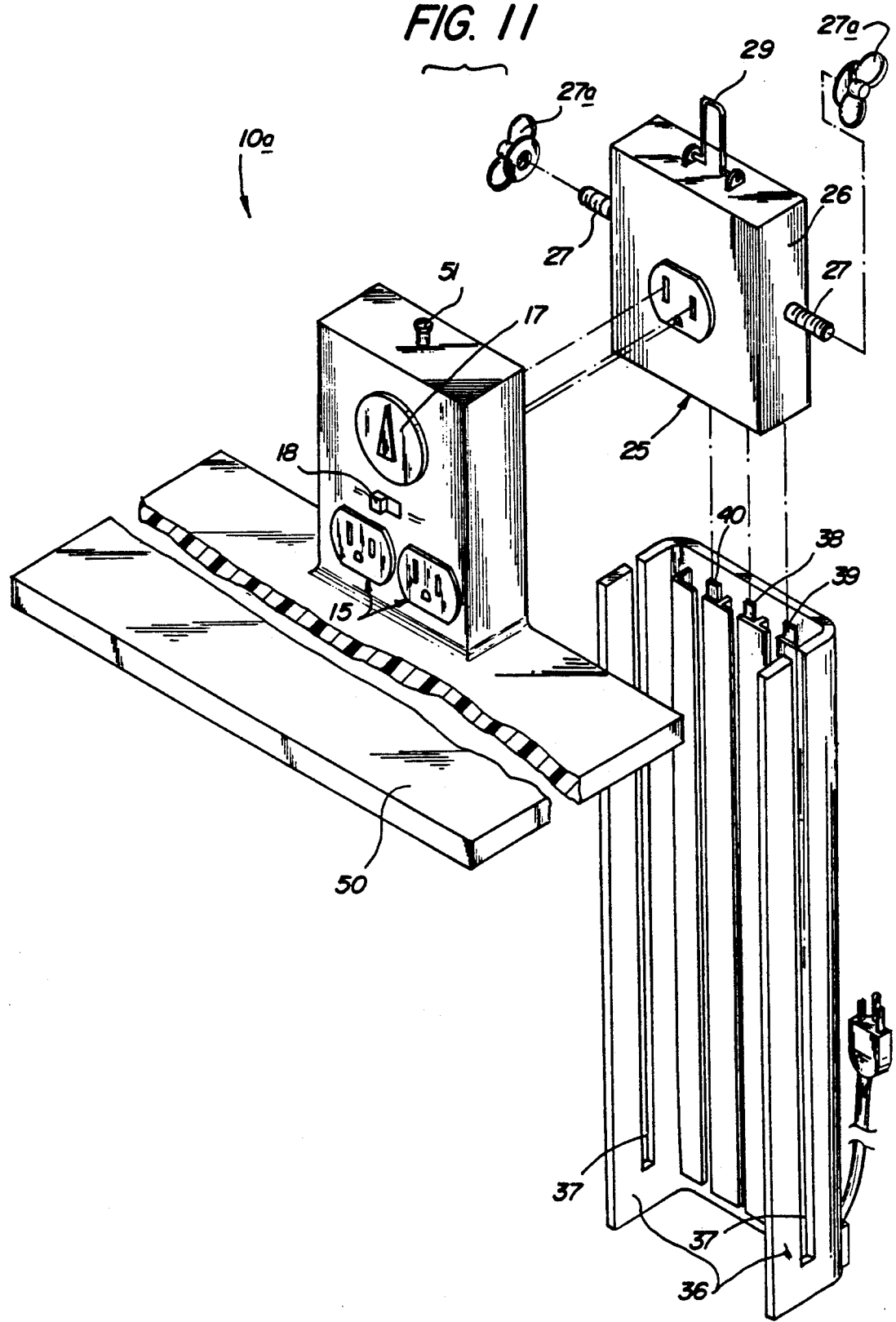
FIG. 11 is an isometric illustration of a modification of the invention utilizing the slide adapter and associated adapter receiving housing relative to the primary housing.

The FIGS. 1 and 2 illustrate a temperature controller as set forth in the U.S. Pat. No. 4,824,013 utilizing a bulb and capillary temperature sensor operating a line voltage load current switch.

More specifically, the thermostatically controlled electrical outlet apparatus 10 of the instant invention, as illustrated in the FIGS. 3 and 4 for example, include a primary housing 11 formed with a front wall 12, a rear wall 13, and side walls 14 as well as a top wall 100 and a bottom wall 101. A plurality of electrical outlet members 15 are directed through the front wall 12 in electrical communication selectively with a housing plug member 20 projecting from the rear wall 13. The electrical outlet members 15 are of a conventional construction utilizing outlet slots 16 for reception of conventional electrical plugs therewithin. A first selector switch 18 mounted to the front wall is arranged to effect selective actuation and direction of electrical current from the housing plug member 20 to the electrical outlet members 15 selectively above or below a predetermined temperature setting preset by the thermostatic control dial 17. A second selector switch 19 mounted to the side wall 14 provides for bypassing of an associated control circuitry within the housing to effect direct communication of the housing plug member 20 to the outlet members 15 through a switching member 24. The control circuit 21 within the housing is operative through a temperature sensor 23 for actuation. A voltage reducer 22 draws power from the electrical plug 20 to effect operation of the control circuit 21 in effecting control of the switching member 24 by way of the temperature sensor 23. If required, the second selector switch 19 may bypass the control circuit 21 in direct communication between the housing plug member 20 to the outlet members 15.

The FIGS. 6-8 illustrate the use of a slide adapter 25 to provide for vertical positioning and mounting of the primary housing 11 as required for clearance in adaption and receiving of various components such as a fan and the like relative to the primary housing 11. The slide adapter 25 includes side walls 26, each including a locking rod 27 orthogonally projecting from each side wall for cooperation with a fastener 27a (see FIG. 11). The slide adapter having respective top and bottom walls 102 and 103 respectively. The slide adapter includes an electrical outlet 28 directed through a front wall of the slide adapter, with a latching loop member 29 pivotally mounted to a top wall of the slide adapter about a pivot mount 30. The slide adapter 31 includes a rear wall with a respective first, second, and third electrical contact head 31, 32, and 33 projecting from the rear wall, with the head defined by a predetermined thickness, with each head mounted to an associated contact post 41. Each head is of a predetermined thickness. The slide adapter is arranged for reception with an adapter receiving housing 34 (see FIG. 9) that includes a receiving housing rear wall 35 and parallel receiving housing side walls 36 to define a generally "U" shaped configuration. Each receiving housing side wall 36 includes a slot 37 originating from an upper edge of each side wall terminating spaced from a lower edge of each side wall. The receiving housing rear wall 35 includes respective first, second, and third electrical contact plates 38, 39, and 40 respectively for electrical communication with the respective first, second, and third contact heads 31, 32, and 33. A first and second "T" shaped guide plate 42 and 43 are mounted to the rear wall, with respective first and second "L" shaped end plates 44 and 45 positioned adjacent respective first and second "T" shaped guide plates 42 and 43. The first and second "T" shaped guide plate and the first "L" shaped end plate 42 and 44 respectively define a first control slot 46 therebetween. The first and second "T" shaped guide plates 42 and 43 define a control slot therebetween, with the second "T" shaped guide plate 43 and the second "L" shaped end plate 45 defining a third control slot 48, with each respective first, second, and third control slot 46, 47, and 48 positioned above and in alignment with respective first, second, and third contact plates 38, 39, and 40. The slots are spaced from their associated contact plates a predetermined spacing substantially equal to the predetermined thickness of each contact head to effect electrical communication of each contact head relative to each contact plate. Further, the guide plates 42 and 43 and the end plates 44 and 45 are of a non-conductive material as is the receiving housing rear wall 35 to insure only electrical communication between the contact plates and the contact heads. The contact plates are in electrical communication through a convenient adapter receiving housing electrical power supply cord 49. In mounting the slide adapter 25 to the adapter receiving housing 34, the locking rods 27 are directed through the associated side wall slots 37 and fastened in a convenient orientation therealong utilizing the fasteners 27a to frictionally secure the adapter housing relative to the side walls of the receiving housing 34. A top wall boss 51 mounted to a top wall of the primary housing 11 receives the latching loop member 29 thereover to prevent pivotment of the primary housing relative to the adapter housing. Further, the primary housing 50 is arranged to include a primary housing support shelf 50 projecting from the bottom wall of the primary housing orthogonally oriented relative to the front wall projecting forwardly thereof to accommodate mounting of a fan and the like thereon relative to the primary housing thusly permitting vertical orientation of the fan and the primary housing relative to the adapter housing structure. The adapter housing accordingly may be provided with openings and the like for mounting of the adapter receiving housing 34 to an associated vertical wall and the like.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A thermostatically controlled electrical outlet apparatus, comprising,
    a primary housing, wherein the primary housing includes a primary housing front wall, a primary housing rear wall, primary housing spaced side walls, a primary housing top wall, and a primary housing bottom wall, and
    at least one electrical outlet member directed through the primary housing front wall, and
    a housing plug member extending exteriorly of the primary housing rear wall, and
    control means within the primary housing to effect electrical communication between the housing plug member and the electrical outlet, and
    a temperature sensor in operative communication with the control means, and
    a switching member in electrical communication with the control means, and
    a thermostat control mounted to the primary housing front wall, and
    a first selector switch in electrical communication between the at least one electrical outlet member and the housing plug member selectively above or below a predetermined temperature directed by the thermostatic control, and
    a voltage reducer in operative communication with the housing plug member and in electrical communication with the control means for providing continuous electrical energy input into the control means, and
    a second selector switch mounted into the primary housing in operative communication with the switching member to effect direct electrical communication between the housing plug member and the electrical outlet, and
    a slide adapter, the slide adapter including spaced slide adapter side walls, each slide adapter side wall including a locking rod projecting orthogonally and exteriorly of the side wall, and the slide adapter including a slide adapter electrical outlet directed through a slide adapter front wall, and the slide adapter including a slide adapter rear wall, the slide adapter rear wall including respective first, second, and third electrical contact heads mounted to the slide adapter rear wall, with each contact head including a contact post extending from the electrical contact head to the slide adapter rear wall, with each electrical contact head defined by a predetermined thickness and each of the respective first, second, and third electrical contact heads in electrical communication with the slide adapter electrical outlet, and an adapter receiving housing arranged for reception of the slide adapter therewithin, and the adapter receiving housing includes spaced parallel adapter receiving housing side walls and an adapter receiving housing rear wall, with the adapter receiving housing of a generally U-shaped configuration, and each of the adapter receiving housing side walls includes a side wall slot extending from an upper distal end of each adapter receiving housing side wall and spaced above an adapter receiving housing side wall lower distal end of each adapter receiving housing side wall, and each side wall slot arranged for receiving a locking rod of the slide adapter therethrough, and each locking rod including a fastener securable to each locking rod and fastened to each locking rod exteriorly of one of said adapter receiving housing side walls, and the adapter receiving housing rear wall includes a respective first, second, and third contact plate arranged for electrical communication with the respective first, second, and third electrical contact heads, and
    a first and second T-shaped guide plate mounted to the adapter receiving housing rear wall extending forwardly thereof between the adapter receiving housing side walls defining a second control slot therebetween, and a first L-shaped end plate positioned adjacent the first T-shaped guide plate defining a first control slot between the first T-shaped guide plate and the first L-shaped end plate, and a second L-shaped end plate positioned adjacent the second T-shaped guide plate to define a third control slot between the second L-shaped end plate and the second T-shaped guide plate, and the first, second, and third control slots spaced from the respective first, second, and third electrical contact plates a predetermined spacing equal to the predetermined thickness of each of said first, second, and third electrical control heads to effect electrical communication between each of said respective first, second, and third electrical control heads and each respective first, second, and third electrical contact plates.

2. An apparatus as set forth in claim 1 wherein the slide adapter top wall includes a latching loop member pivotally mounted thereto, wherein the latching loop member includes a pivot mount fixedly secured to the slide adapter top wall, and the primary housing including a primary housing top wall boss receiving the latching loop member thereabout when the primary housing plug member is directed into the slide adapter electrical outlet.

3. An apparatus as set forth in claim 2 wherein the primary housing bottom wall includes a support shelf extending orthogonally and beyond the primary housing front wall for accommodating an appliance thereon.

* * * * *